(12) United States Patent
Kastelein et al.

(10) Patent No.: US 9,796,036 B2
(45) Date of Patent: Oct. 24, 2017

(54) GUIDE DEVICE FOR WELDING CURVILINEAR PIPE SURFACES

(71) Applicant: Allseas Group S.A., Chantel-Saint-Denis (CH)

(72) Inventors: Maarten Willem Kastelein, Heemstede (NL); Gerardus Maria Kramer, Rotterdam (NL)

(73) Assignee: Allseas Group S.A., Chatel Saint-Denis (CH)

( * ) Notice: Subject to any disclaimer, the term of this patent is extended or adjusted under 35 U.S.C. 154(b) by 775 days.

(21) Appl. No.: 13/784,239

(22) Filed: Mar. 4, 2013

(65) Prior Publication Data

US 2013/0175258 A1   Jul. 11, 2013

Related U.S. Application Data

(63) Continuation of application No. 11/788,367, filed on Apr. 18, 2007, now Pat. No. 8,481,882.

(30) Foreign Application Priority Data

Apr. 21, 2006   (NL) ..................................... 1031654

(51) Int. Cl.
| | |
|---|---|
| *B23K 9/02* | (2006.01) |
| *B23K 9/00* | (2006.01) |
| *B23K 5/24* | (2006.01) |
| *B23K 9/028* | (2006.01) |
| *B23K 9/28* | (2006.01) |
| *B23K 37/02* | (2006.01) |

(52) U.S. Cl.
CPC .............. *B23K 9/0026* (2013.01); *B23K 5/24* (2013.01); *B23K 9/0286* (2013.01); *B23K 9/287* (2013.01); *B23K 37/0217* (2013.01)

(58) Field of Classification Search
USPC ....... 219/60 A, 60 R, 125.11, 59.1; 104/106, 104/107, 110, 118, 119; 74/52
See application file for complete search history.

(56) References Cited

U.S. PATENT DOCUMENTS

| | | | | |
|---|---|---|---|---|
| 4,726,300 | A | * | 2/1988 | Kazlauskas .................. 104/118 |
| 5,944,248 | A | * | 8/1999 | Van Heuveln .................. 228/45 |
| 6,345,593 | B1 | * | 2/2002 | Stewart et al. ............... 119/706 |

\* cited by examiner

*Primary Examiner* — Brian Jennison
(74) *Attorney, Agent, or Firm* — Meyertons, Hood, Kivlin, Kowert & Goetzel, P.C.; Mark R. DeLuca

(57) ABSTRACT

Guide device for use in the processing, in particular welding, of curved surfaces, in particular pipe surfaces, comprising a flexible elongate body provided with a guide for processing means; tensioning means for tensioning the flexible body around the curved surface; wherein the flexible body is provided along its length with indicators arranged according to a determined pattern, this pattern being such that a determined position along the flexible body can be inferred on the basis of the detection of the indicators.

10 Claims, 5 Drawing Sheets

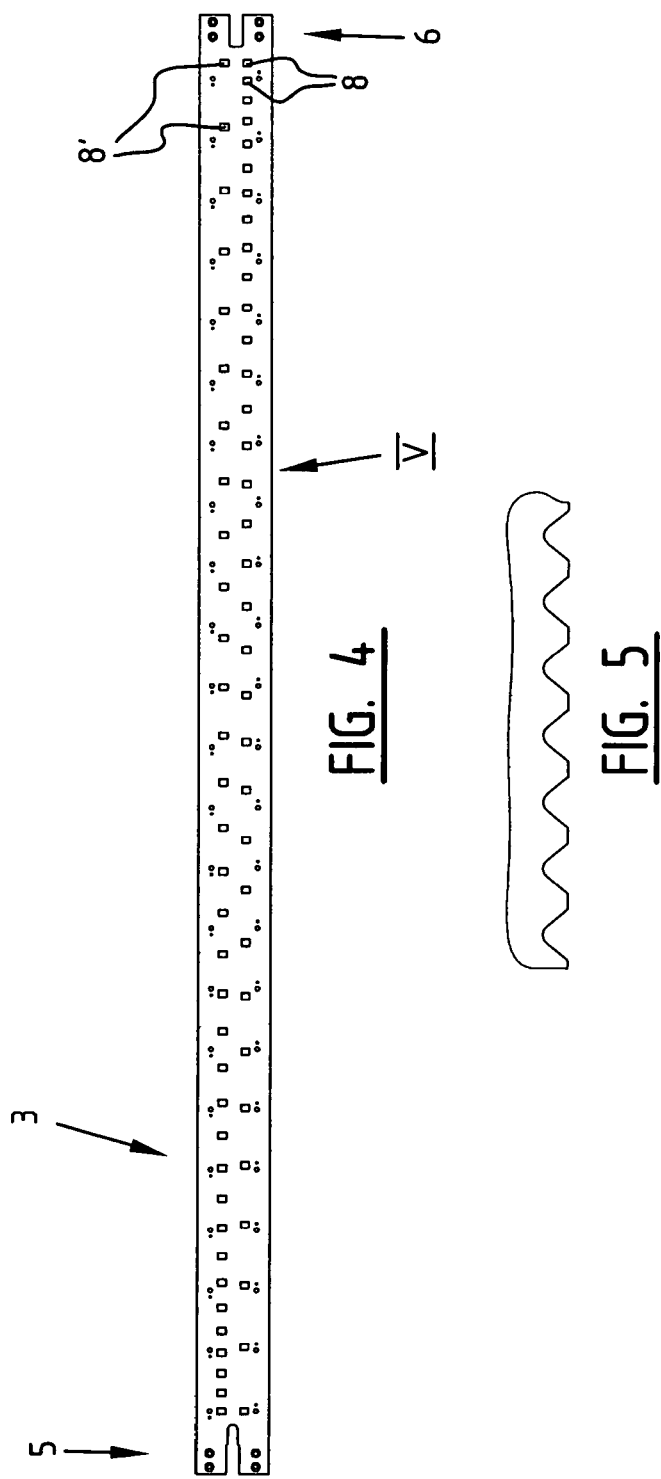

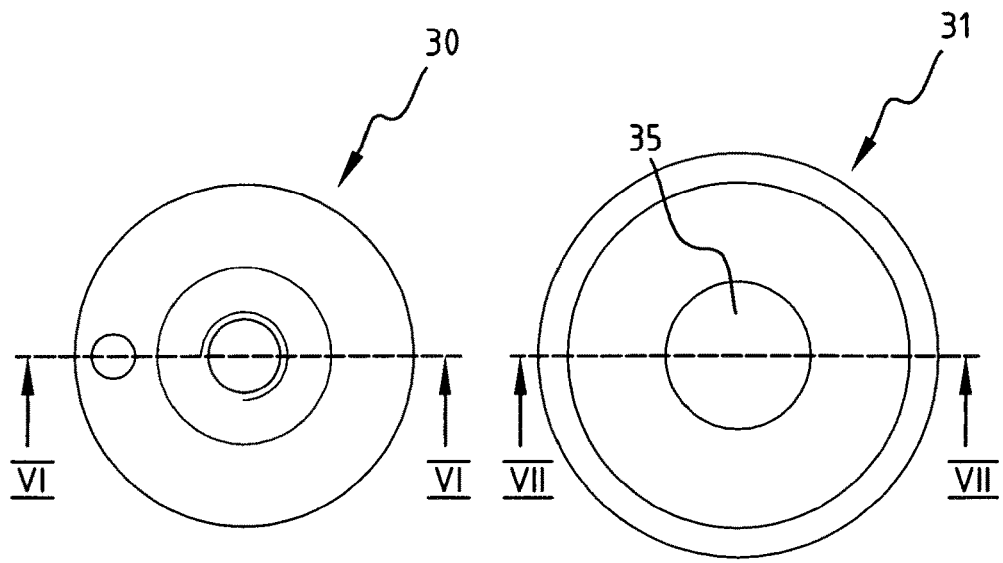
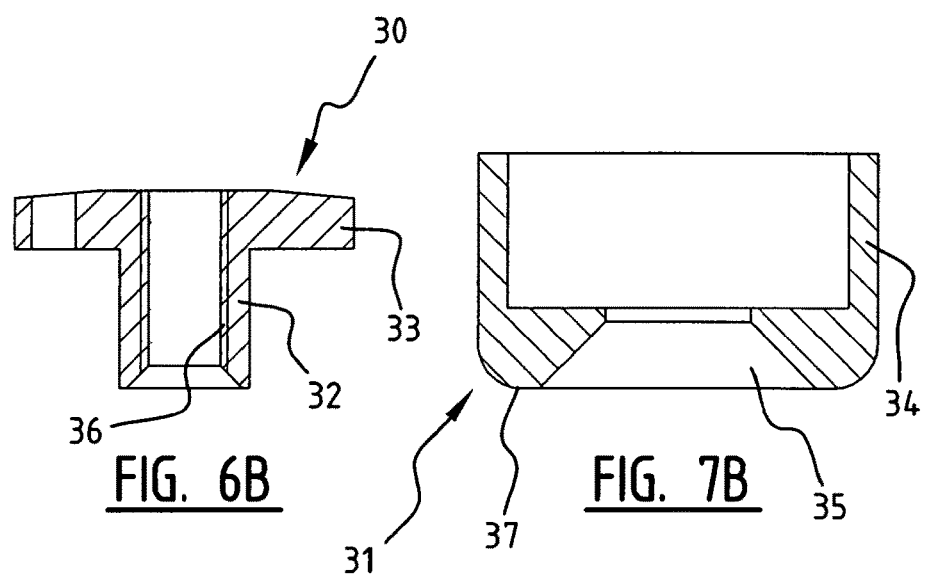
FIG. 6A  FIG. 7A
FIG. 6B  FIG. 7B

GUIDE DEVICE FOR WELDING CURVILINEAR PIPE SURFACES

PRIORITY CLAIM

This application is a Continuation of U.S. patent application Ser. No. 11/788,367 entitled "GUIDE DEVICE FOR WELDING CURVILINEAR PIPE SURFACES" filed on Apr. 18, 2007.

BACKGROUND OF THE INVENTION

1. Field of the Invention

The present invention relates to a guide device for use in the processing, in particular welding, of curved surfaces, in particular pipe surfaces, and more in particular pipelines. Such a guide device generally comprises a flexible elongate body provided with a guide for processing means, and tensioning means for tensioning the flexible body around the curved surface.

2. Description of the Relevant Art

In the welding of pipelines it is known to use a guide band along which a carriage with one or more welding torches is guided. In the laying of pipelines at sea a number of welding steps must generally take place on board ship, these welding steps taking place in different welding stations. According to the known systems an operative of a welding station will indicate on the pipe, for instance using chalk as indicator, the point to which the welding layer has been deposited. The operative of a subsequent welding station must then search for this location and, from this location, carry out a following welding step in which a subsequent welding layer is deposited. Such a working method slows down the welding process and impedes automation thereof.

SUMMARY OF THE INVENTION

The present invention has for its object to provide a guide device of the type stated in the preamble with which a location along the guide device can be determined in a manner which is simple and can be automated. The guide device is distinguished for this purpose in that the flexible body is provided along its length with indicators arranged according to a determined pattern, this pattern being such that a determined position along the flexible body can be inferred on the basis of the detection of the indicators.

In this manner a location on the flexible body can thus be determined with sufficient accuracy on the basis of the pattern of indicators arranged on the flexible body. The location can thus be exactly determined at the end of a welding step, and this location can once again be searched for prior to a subsequent welding step.

A sensor adapted to detect these indicators and a signal processing unit connected to the sensor for determining a location along the flexible body on the basis of the detected indicators are preferably provided. In this away a determined location along the guide band can be determined for further use in a manner which is simple and can be automated.

According to the preferred embodiment the indicators are holes. The pattern can for instance consist of at least one row of indicators arranged in the lengthwise direction of the flexible body, wherein the mutual distance between adjacent indicators gradually increases. This is a simple pattern which is easy to detect.

According to the preferred embodiment, the pattern comprises a first row of indicators and a second row of indicators parallel thereto, wherein the mutual distance between adjacent indicators of the first and second row increases in opposite directions. In this way the same pattern is seen by the sensor irrespective of the manner in which the guide device is arranged on the curved surface (for instance clockwise or counter-clockwise in the case of a pipe surface).

The flexible body is preferably further a metal band, and the indicators are preferably formed by punching holes. According to a possible embodiment, the metal band has a serrated edge. Such an edge enables the driving of the carriage of the processing means by means of a drive wheel which engages on this edge.

In the case of a guide band arranged around a pipe surface it can be of further importance that it be properly centered and can be arranged with a fixed peripheral length around the pipe surface. This fixed peripheral length is particularly useful when operation takes place with indicators in order to enable detection of the same pattern along the periphery at all times.

Guide bands exist wherein spacers are arranged between the guide band and the pipe surface. Spring means can be arranged therein. However, such spacers typically extend over the full width of the guide band. This has the drawback that the friction between the spacers and the pipe surface on which the guide band is mounted is quite high, which can result in an asymmetrical, non-centered arrangement of the guide band around the pipe surface, wherein the springs are more compressed on one side than on the other.

In order to solve this problem the invention further proposes a guide device as described in claims 15 to 18. By ensuring that the width and length dimensions of the contact surface between each spacer and the pipe surface are small relative to the dimensions of the guide band the friction is limited to a minimum and the guide band can be arranged properly centered around a pipe surface, wherein the spring means are all compressed in a substantially uniform manner.

According to an advantageous embodiment, each spacer comprises a spring carrier which is connected to the guide band and a spring holder arranged in spring-mounted manner therearound, wherein the spring means are preferably cup springs acting between the spring carrier and the spring holder. This embodiment will be described further with reference to the figures.

The present invention further relates to a flexible body for use in a device according to the invention.

The present invention also relates to a method for welding a pipeline in a number of welding passes making use of a device according to the invention, wherein a first layer is deposited during a first welding pass and a second layer is deposited in a subsequent welding pass. The method is distinguished in that:

the final location of the welding layer is determined on the basis of the indicators after depositing of the first layer;

this final location is searched for on the basis of the indicators on the guide band prior to depositing of the second layer.

Such a method thus allows further automation of the welding process.

BRIEF DESCRIPTION OF THE DRAWINGS

Above-mentioned and other features will be further elucidated hereinbelow on the basis of an exemplary embodiment of the guide device according to the invention which is described with reference to the accompanying drawings. In the drawings:

FIG. 4 is a top view of the embodiment of the guide band of FIG. 3 in detached situation;

FIG. 5 is a detail of the edge of the guide band shown in FIG. 4;

FIGS. 6A and 6B show, respectively, a top view and cross-section along line VI-VI of FIG. 6A of a first part of a spacer; and FIGS. 7A and 7B show respectively a top view and cross-section along line VII-VII of FIG. 7A of a second part of a spacer.

Figure 1:
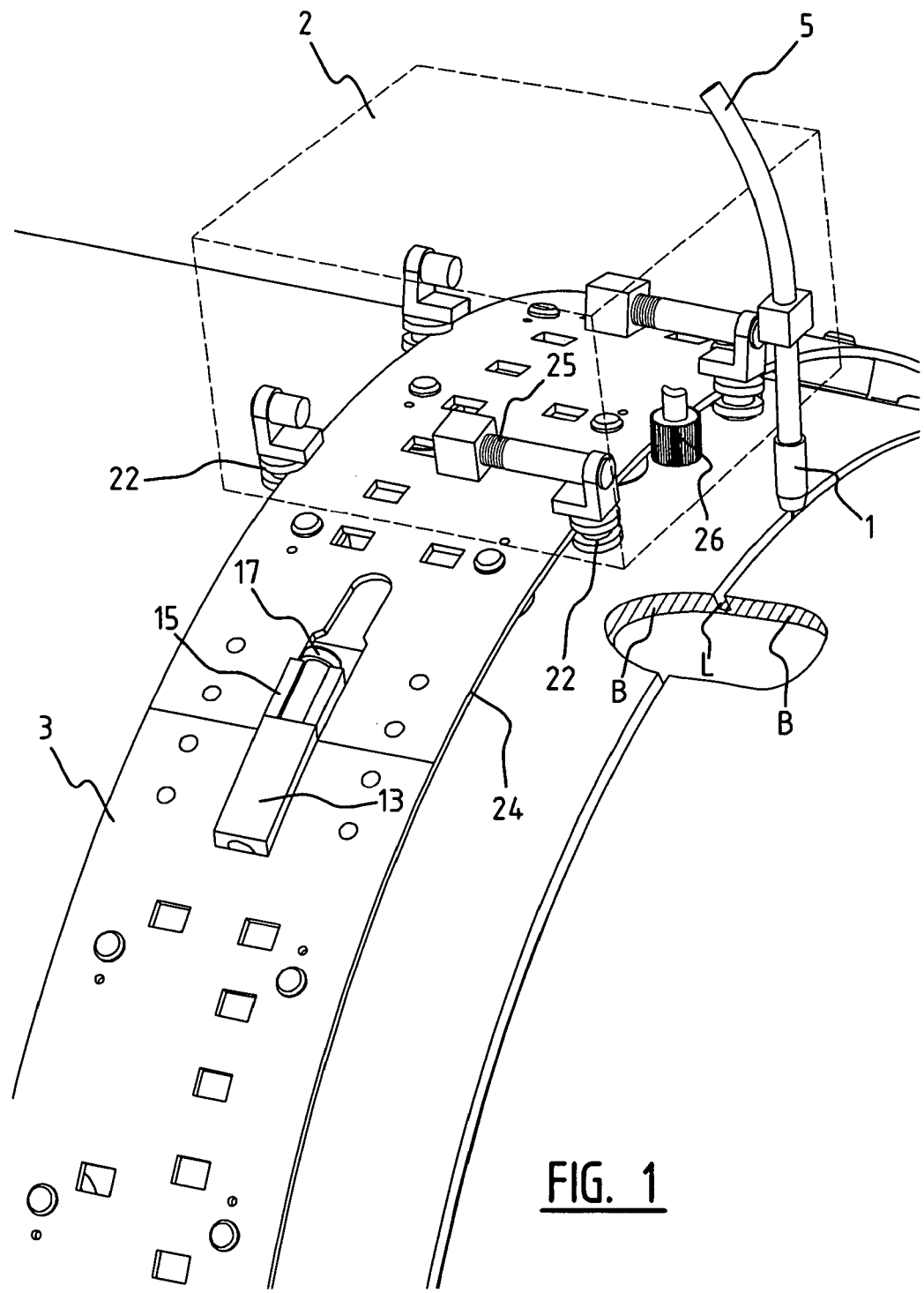
FIG. 1 shows a detail of an embodiment of the guide band according to the invention arranged around a pipe surface, with a welding torch as processing member.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

FIG. 1 shows schematically a device for welding together pipes B which must be welded to each other on their end edges. The end edges are typically formed such that a weld groove L is created when the pipes are placed against each other.

Such weld grooves are generally filled in multiple passes of the welding torch, wherein one layer of the welding material at a time is deposited in the groove. One or more welding torches 1 can be used for this purpose. The welding torch is supported by a carriage 2 guided along a guide band fastened around one of the pipe ends. In the shown embodiment welding torch 1 is connected to a flexible feed pipe 5 for a protective gas, although this is not a prerequisite and depends on the welding technique used. The welding device is assumed known per se and does not form part of the invention.

Carriage 2 is provided with four guide wheels 22 which have a U-shaped peripheral surface in which the guide edge 24 of guide band 3 is received. By biasing the opposite guide wheels 22 toward each other, for instance with a spiral spring assembly 25, the pair of wheels is held and pressed firmly against the sides of guide band 3. The driving of carriage 2 along guide band 3 can take place in random manner. In the shown embodiment the driving is performed by means of a drive wheel 26 which engages on the side edge of the guide band and is driven by a drive mechanism (not shown). Such a carriage is assumed known and will not be elucidated in more detail here.

Figure 2:
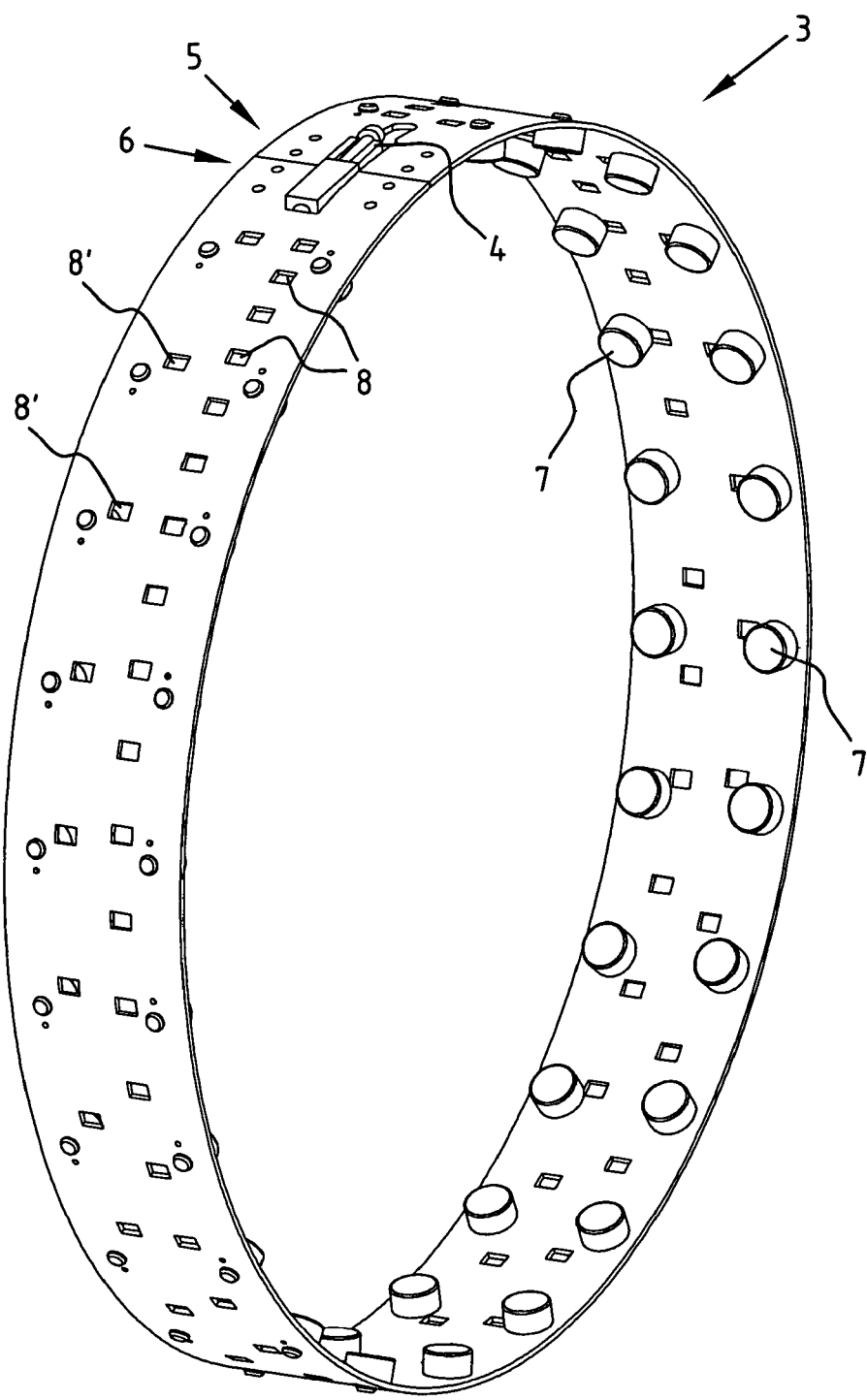
FIG. 2 shows a perspective view of an embodiment of the guide band according to the invention.
Figure 3A:
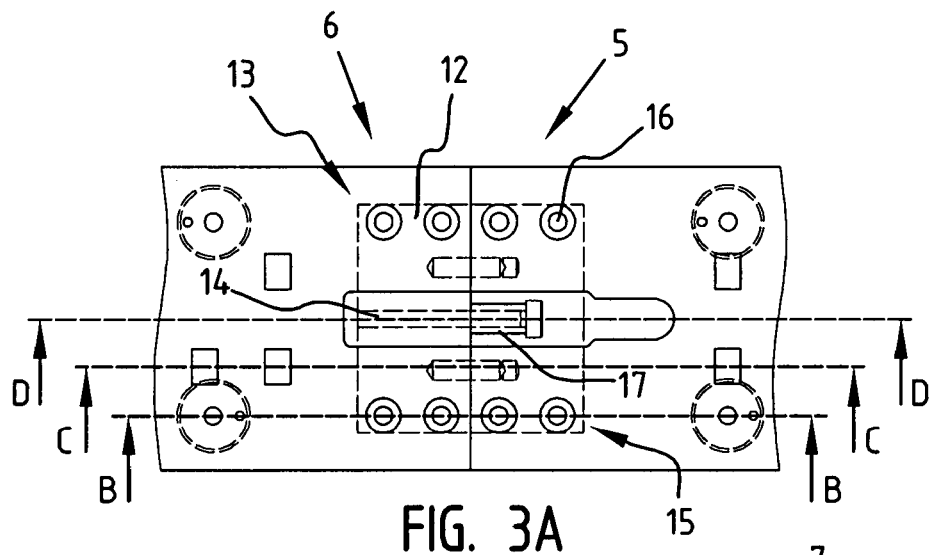
FIG. 3A is a top view of the tensioning means of the guide band of FIG. 2.
Figure 3B:
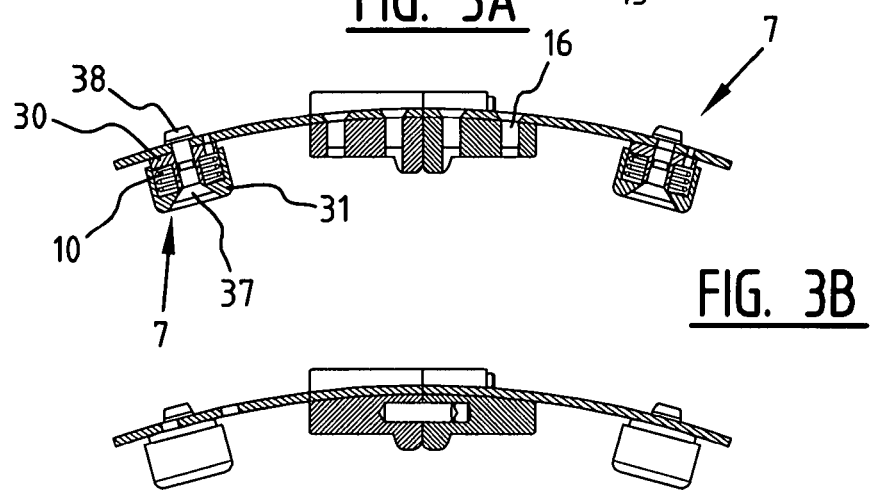
FIG. 3B shows a cross-section along line B-B in FIG. 3A.
Figure 3C:
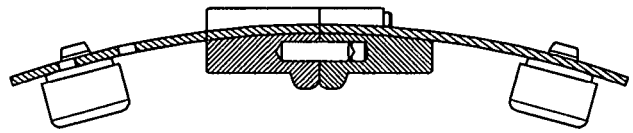
FIG. 3C shows a cross-section along line C-C in FIG. 3A.
Figure 3D:
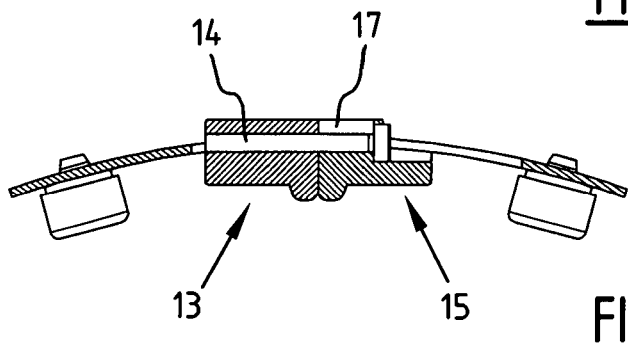
FIG. 3D shows a cross-section along line D-D in FIG. 3A.

FIG. 2 is a perspective view showing an embodiment of guide band 3 according to the invention in a situation where it is formed into a ring. FIG. 4 shows a top view of the guide band in the extended state. The guide band is provided on its inner side with spacers 7 in which spring means 10 are arranged. Tensioning means are provided between outer ends 5, 6 and guide band 3 for the tensioning as a ring around the pipe surface. Tensioning means 4 are shown in more detail in FIGS. 3A-3D. A first element 13 of the tensioning means is fastened to outer end 6 using four screws 16. This first element 13 is provided with a threaded bore 14. The second element 15 is fastened to the other outer end 5 using four screws 16. This element is provided with an elongated cavity 17 for placing therethrough of a screw which is tightened in threaded bore 14.

Guide band 3 is further provided with indicators which are arranged in accordance with a determined pattern and which here take the form of holes 8, 8'. The pattern consists here of two sequences of square holes. The first sequence is a number of square holes 8 which are arranged on a peripheral line, wherein the mutual distance between two adjacent holes gradually increases running from outer end 6 to outer end 5. The second sequence is likewise formed by a number of square holes 8' arranged on a peripheral line, wherein the mutual distance between two adjacent holes gradually decreases running from outer end 6 to outer end 5. This gradual increase/decrease is identical for both sequences such that in the case of reverse arrangement of the guide belt, i.e. when outer ends 5 and 6 are interchanged, an identical pattern is obtained.

A sensor (not shown) for detecting this pattern is provided in carriage 2. This sensor is coupled to a signal processing unit adapted to determine the location along the guide belt on the basis of the holes along which the carriage passes and which are detected by the sensor.

During laying of pipelines four to five welding steps must generally take place on the ship, wherein after each welding step the ship travels a determined distance, whereby the weld is carried to the following welding station and the following welding step can be performed. Using the indicators on the guide band and the sensor the final location of the weld is determined after each welding step and transmitted to the following welding station. In the following welding station the welding torch is carried once again to this location using the indicators and the sensor such that the welding step begins exactly at the position where the previous welding step was ended. Very precise welding can thus be carried out in this way.

A possible embodiment of the spacer with spring means will now be described in detail with reference to FIGS. 3A-3D and FIGS. 6A-6B and 7A-7B. Spacer 7 comprises a spring holder 31 and a spring carrier 30 accommodated therein. Spring carrier 30 is connected to the guide band using a screw 38. Spring holder 31 has limited movement in the direction of the guide band. This is realized by providing spring holder 31 with an opening 35 having dimensions which are such that spring holder 31 can move along the periphery of spring carrier 30 in the direction of the guide band. The freedom of movement is herein adjustable by means of a screw 37 (see FIG. 3B) which protrudes through opening 35 of spring holder 31 and is screwed fixedly into a threaded bore 36 in spring holder 30. Cup springs 10 act between spring carrier 30 and spring holder 31. The form of spring carrier 30 and that of spring holder 31 must therefore be adapted to each other such that spring means can be accommodated in spring holder 31 on the one hand and that spring holder 31 has limited movement relative to spring carrier 30 on the other. In the shown embodiment spring holder 31 is substantially cup-shaped with a bottom 32 provided with an opening 35, and with a cylindrical wall 34. Spring carrier 30 here takes the form of a hollow cylinder 32 in which screw thread is provided and the top end of which is provided with a radially oriented collar 33. The skilled person will however appreciate that other forms are possible for spring holder 31 and spring carrier 30.

In addition, the contact surface between the spring holder and the curved surface on which the guide band is mounted must preferably be as small as possible in order to limit the friction with the curved surface. To this end spring holder 31 preferably has a rounded bottom, as can best be seen in FIG. 7B, and the surface area of the annular support surface is preferably as small as possible.

The invention is not limited to the above described embodiment, and certainly not to the processing of pipelines. Any surface on which a flexible guide band can be mounted in suitable manner falls within the scope of the invention. The skilled person will further appreciate that many different patterns of indicators are possible. The scope of protection of the present invention is therefore defined solely by the appended claims.

What is claimed is:

1. Guide device for guiding a welding carriage for welding of a pipe surface, comprising:
    a flexible elongate body provided with a guide for the welding carriage, said flexible elongate body having an underside;
    a tensioner for tensioning the flexible elongate body around the pipe;
    wherein the flexible elongate body is provided on said underside with a plurality of spacers comprising a spring mechanism;
    wherein a spacer of said plurality of spacers comprises a cup-shaped spring holder having a first open end directed towards the flexible elongate body and a second end remote from the flexible elongate body in the form of an annular foot having an annular contact surface for making contact with the pipe surface;
    wherein the spring mechanism of the spacer is provided in the cup-shaped spring holder; and acts between the spring holder and the flexible elongate body.

2. The guide device of claim 1, wherein the flexible elongate body is a metal band.

3. The guide device of claim 1, wherein the spring holder is mounted for limited movement relative to the flexible elongate body.

4. The guide device of claim 1, further comprising a spring carrier fitting into the spring holder and fixedly connected to the flexible elongate body in a fixed position relative to the flexible elongate body, wherein the spring holder is coupled to the spring carrier and the spring mechanism is positioned between the spring holder and the spring carrier.

5. The guide system of claim 4, wherein a screw protrudes through an opening of the annular support foot and is screwed fixedly in a threaded bore in the spring carrier.

6. The guide device of claim 1, wherein the spring holder has a rounded bottom.

7. Guide system for guiding a welding carriage for welding a pipe surface, said guide system comprising:
    a welding carriage;
    a metal band provided with a guide for the welding carriage;
    a tensioner for tensioning the metal band around the pipe surface;
    wherein the metal band is provided on an underside thereof with a plurality of spacers; each spacer of said plurality of spacers being associated with a spring mechanism, and comprising a cup-shaped spring holder, having a first open end directed towards the metal band and a second end remote from the metal band in the form of an annular support foot having an annular contact surface for making contact with the pipe surface;
    wherein the spring mechanism is provided in the cup-shaped spring holder; and acts between the spring holder and the metal band.

8. The guide system of claim 7, further comprising a spring carrier fitting into the spring holder and fixedly connected to the metal band in a fixed position relative to the metal band, wherein the spring holder is coupled to the spring carrier and the spring mechanism is positioned between the spring holder and the spring carrier.

9. The guide device of claim 8, wherein a screw protrudes through an opening of the annular support foot and is screwed fixedly in a threaded bore in the spring carrier.

10. The guide system of claim 7, wherein the spring holder has a rounded bottom.

* * * * *